United States Patent
Boss et al.

(10) Patent No.: US 8,004,415 B2
(45) Date of Patent: Aug. 23, 2011

(54) LIQUID EXPOSURE DETECTION

(75) Inventors: Gregory J. Boss, American Fork, UT (US); Peter G. Finn, Brampton, CA (US); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/245,825

(22) Filed: Oct. 6, 2008

(65) Prior Publication Data

US 2010/0085155 A1   Apr. 8, 2010

(51) Int. Cl.
*G08B 21/00* (2006.01)

(52) U.S. Cl. ........ 340/618; 340/500; 340/604; 340/611; 340/616; 340/505; 340/518; 340/523

(58) Field of Classification Search .................. 340/604, 340/611, 616, 618–625, 505, 518, 521, 523
See application file for complete search history.

(56) References Cited

U.S. PATENT DOCUMENTS

| | | | |
|---|---|---|---|
| 5,281,826 | A | 1/1994 | Ivancic et al. |
| 5,995,898 | A | 11/1999 | Tuttle |
| 6,671,594 | B2 | 12/2003 | Miller |
| 6,812,846 | B2 | 11/2004 | Gutta et al. |
| 7,138,907 | B2 | 11/2006 | Young et al. |
| 2005/0024214 | A1 | 2/2005 | King et al. |

*Primary Examiner* — Daniel Wu
*Assistant Examiner* — Son M Tang
(74) *Attorney, Agent, or Firm* — Patrick J. Daugherty; Driggs, Hogg, Daugherty & Del Zoppo Co., LPA (57) ABSTRACT

Methods, systems and program products are provided for monitoring an article for fluid exposure. A plurality of liquid sensors is incorporated into an article beneath an outer layer in a furnishing installation. In response to a fluid-detected or no-fluid-detected state, polling the sensors and sometimes other data, a processor component determines fluid exposure, sensor failure and tampering events and stores event data in a memory. Pairs of the sensors are sometimes provided within expected liquid exposure saturation footprint areas. GPS coordinate, weather condition data and structural component positioning data may also be associated with event data.

19 Claims, 4 Drawing Sheets

LIQUID EXPOSURE DETECTION

FIELD OF THE INVENTION

The present invention generally relates to observing and tracking the exposure of articles to water and other liquid products, and more particularly with respect to articles having outer surfaces permeable to liquids. Accordingly methods, systems, and program products are provided that may detect, store and/or allow for retrieval of data pertaining to the exposure of articles to water and other liquid products, including temporal exposure data.

BACKGROUND OF THE INVENTION

Furnishings and finishes utilized in interior or controlled environmental applications commonly utilize outer surface materials permeable to air, water vapor, water and fluids, such as woven fiber fabrics and carpeting made with composite fiber surfaces. Problems may arise when permeable furnishings and outer layer components are exposed to water and other liquids: for example a spilled beverage may soak into upholstered furniture seating, or into carpeting and underlying cushioning material. And of particular concern is identifying such exposures and damages associated therewith.

For example, vehicles, including passenger automobiles, trucks, rail cars, aircraft, all-terrain vehicles (ATV's), mobile homes and campers may be sophisticated, complex and expensive, requiring a substantial commitment of funds for purchase and maintenance, and which may command high prices for rental or lease to third parties or resale to subsequent purchasers and also retain substantial residual value at the end of a rental or lease term. The value of these vehicles or compliance with lease or rental agreement terms may be dependent in part on the condition and maintenance of interior passenger area seating and flooring finishes and underlying material conditions. And dwelling units such as houses, apartments, condominiums, hotels, inns, motels and school dormitories also incorporate furnishings and carpeting with outer layers permeable to liquid exposure and incursion.

When rain or snow is admitted into a building or vehicle interior through open windows, skylights, trunk lids or retracted convertible tops, seating, bedding, carpeting and/or underlying cushioning materials may be exposed to significant amounts of water. Other liquid-based chemicals and products, such as including foodstuffs and beverages (soft drinks, oils, vinegars, syrups, juices, coffees, teas, sports drinks, etc.) and common household chemicals (lubricating oils, gasoline, kerosene, anti-freeze compounds, cleaning fluids, liquid bleach) may also be spilled in dwelling and vehicle interiors or trunk areas. The furnishings or their underlying cushioning materials may absorb and retain said water, liquids or chemicals, which may result in a variety of actual or potential damage to the furnishings, associated components, or to components of structures or vehicle incorporating them. Illustrative but not exhaustive damage examples include rust, mildew, molding, odor, and structural deteriorations, and other damage will be apparent to one skilled in the art.

Problems arise when a party with knowledge of a water or chemical exposure fails to provide this knowledge to a current or prospective owner or operator of a vehicle or dwelling unit, for example intentionally withholding the information in order to improperly inflate the market value of a vehicle or dwelling unit. And an undiscovered spill may only manifest itself through an unpleasant odor after termination of a car or dwelling rental or occupancy period and during or after a subsequent rental or lease to another customer, making determination of the appropriate party responsible for the exposure difficult or impossible.

Prior art methods for determining whether or not interior furnishings and finishes have suffered a spill or other water or liquid exposure event generally rely upon physical inspection and verification techniques. However, surface evidence of an exposure may be cleaned-up or cured, leaving no visible indication of the exposure of the underlying materials and components, and some water or clear fluids may leave no visible evidence as they soak through and saturate the underlying areas. Other non-visual evidence such as odors caused by the exposure may also be abated or masked by cleaning and disinfecting agents. And some evidence may fade, diminish or disappear over time, along with the practical ability to detect or verify the liquid exposure event, even as rust, mildew and/or mold damage is slowly progressing toward a later manifestation. Furthermore, evidence of a liquid exposure event may be intentionally obstructed or removed in order to actively conceal the event.

Adequately discovering or abating liquid exposure events may require invasive techniques that are difficult, time consuming or necessitating damage. For example, automobile seating and floor and trunk coverings, and dwelling unit carpeting, are generally installed permanently for their expected service life, and discovering or abating liquids soaking through an outer layer may require cutting open or removing seat, floor or trunk coverings to access the underlying areas.

SUMMARY OF THE INVENTION

Methods, systems and program products are provided for determining whether an interior furnishing or material has been exposed to a spill or other liquid exposure. In one aspect a method for monitoring an article for fluid exposure comprises incorporating a plurality of liquid sensors into an article beneath an outer layer in a furnishing installation, the article and the sensor not visually apparent without removal of the outer layer. A processor component polls each of the plurality of liquid sensors to determine whether any is currently detecting liquid, having a state set to fluid-detected or to no-fluid-detected. If none of the polled sensors reports currently detecting liquid and the state is set to fluid-detected, the state is reset to no-fluid-detected, and associating polling temporal data is saved to an open fluid exposure event data entry in a memory. If at least a first liquid sensor is currently detecting liquid, then the first and a second of the polled plurality of liquid sensors are re-polled, and if either is not currently detecting liquid, a failure event data entry is created and the state is set to no-fluid-detected; or else if the state is no-fluid-detected, the method comprises setting the state to fluid-detected, creating a new fluid exposure event data entry in the memory including polling and re-polling temporal data; or if the state is fluid-detected, adding temporal data associated with the re-polling of the plurality of sensors to the open fluid exposure event data entry in the memory.

Another method comprises deploying pairs of the plurality of sensors within expected liquid exposure saturation footprint areas of the article, wherein re-polling first and second liquid sensors comprises selecting first and second paired sensors. Another method comprises reporting a tampering event if a circuit communication from a one of the plurality of sensors to the processing means or a power source connected to the plurality of sensors is interrupted, with some others further comprising a GPS transponder in communication with the processing means communicating GPS coordinate data associated with polling or the re-polling, the processing means associating the GPS coordinate data with an event data entry.

Some methods further comprise processing means associating weather condition data with an associated event data entry, others associating data indicative of a structural component positioned to admit rain or snow onto the outer layer. And still others further comprise associating data indicative of a power source status with an event data entry.

In another aspect methods are provided for producing computer executable program code, storing the produced program code on a computer readable medium, and providing the program code to be deployed to and executed on a computer system, for example by a service provider who offers to implement, deploy, and/or perform functions for others. Still further, an article of manufacture comprising a computer usable medium having computer readable programs embodied in said medium may be provided. Program codes thus may comprise instructions which, when executed on a processor component or computer system, cause the component or computer system to poll each of a plurality of liquid sensors to determine whether any is currently detecting liquid present, the processor component or computer having a state set to fluid-detected or to no-fluid-detected, wherein the plurality of liquid sensors are incorporated into an article beneath an outer layer in a furnishing installation, and wherein the article and the sensor are not visually apparent without removal of the outer layer; and if none of the polled plurality of liquid sensors reports currently detecting liquid and the state is set to fluid-detected, reset the state to no-fluid-detected and associate polling temporal data to an open fluid exposure event data entry in a memory.

Further, components or computers are configured to, if at least a first polled liquid sensor is currently detecting liquid, re-poll the first and a second of the polled sensors to determine whether each is currently detecting liquid, and if either of is not currently detecting liquid, create a failure event data entry in the memory for one and set the state to no-fluid-detected, else if the state is no-fluid-detected, set the state to fluid-detected, create a new fluid exposure event and associate polling and re-polling temporal data with the new fluid exposure event. Further, the component or computer is configured to, if the state is fluid-detected, add temporal data associated with the re-polling of the plurality of sensors to the open fluid exposure event data entry in the memory. Moreover, with pairs of sensors deployed within expected liquid exposure saturation footprint areas of the article, the component or computer infrastructure thereby operable to re-poll the first and the second liquid sensors by selecting at least one of the plurality of sensors proximate to the first sensor within a one of the footprint areas as the second liquid sensor.

Additionally, a component or computer is also operable to report a tampering event if a circuit communication from one of the sensors or a power source connected to the plurality of sensors is interrupted. In some examples a component or computer is operable to obtain GPS coordinate data associated with polling or re-polling, and associate the GPS data, weather condition data, power source data indicative of liquid sensor power source status or component data indicative of a structural component positioned to admit rain or snow onto an outer layer with an event data entry.

In another aspect fluid detection systems are provided configured to monitor articles for fluid exposure, comprising processing means comprising a logic controller and a plurality of liquid sensors in circuit communication with the processing means and incorporated into an article beneath an outer layer in a furnishing installation wherein the article and the sensor are not visually apparent without removal of the outer layer. The processing means is configured to poll the liquid sensors to determine whether any is currently detecting liquid present within the article, and has a state set to fluid-detected or to no-fluid-detected. If none of the polled sensors reports currently detecting liquid and the state is set to fluid-detected, the processing means is configured to reset the state to no-fluid-detected and associate polling temporal data to an open fluid exposure event data entry in a memory device in communication with the processing means.

If at least a first of the polled plurality of liquid sensors is currently detecting liquid, the processing means is configured to re-poll the first and a second of the polled plurality of liquid sensors to determine whether each is currently detecting liquid; and if either of the first and the second re-polled sensors is not currently detecting liquid, create a failure event data entry in the memory for a one of the first and the second re-polled sensors and set the state to no-fluid-detected; else, if the state is no-fluid-detected, set the state to fluid-detected, create a new fluid exposure event data entry in the memory including polling and re-polling temporal data, or if the state is fluid-detected, add temporal data associated with the re-polling of the plurality of sensors to the open fluid exposure event data entry in the memory.

In one aspect, wherein pairs of the plurality of sensors are deployed each within expected liquid exposure saturation footprint areas of the article, a system processing means is configured to re-poll first and second of polled plurality of liquid sensors by selecting at least one of the plurality of sensors proximate to the first sensor within a one of the footprint areas as the second liquid sensor. And in another aspect, wherein the article is a vehicle interior furnishing or flooring component, the outer layer is a fabric or fiber layer permeable to liquid, the processing means is an onboard vehicle diagnostic interface computer.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
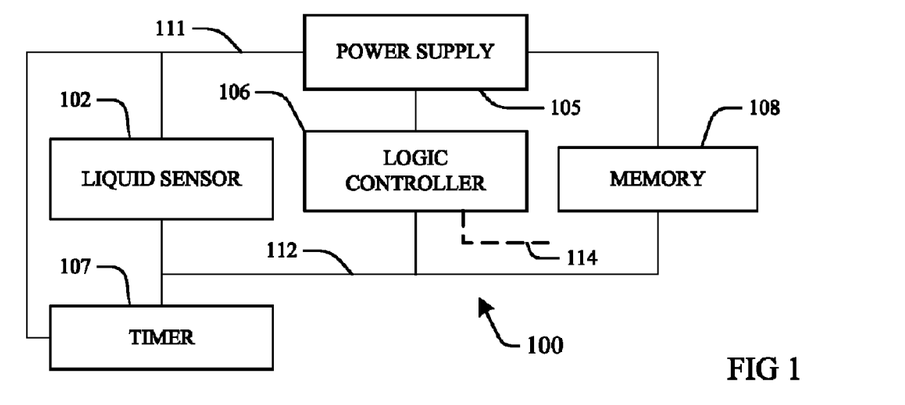
FIG. 1 is a block diagram illustrating an apparatus and system for detecting and reporting a liquid exposure event according to the present invention.

For convenience purposes, the Detailed Description of the Invention has the following sections
I. General Description
II. Computerized Implementation I. General Description There is a need for practical, effective and reliable methods and systems for determining whether an interior furnishing or material has been exposed to a spill or other liquid exposure event that address the above problems, as well as others. Accordingly, FIG. 1 illustrates a liquid exposure detector system 100. The detector 100 comprises at least one liquid sensor 102, a power supply 105, a timer 107, and a memory element 108 all in a circuit communication 112 with a logic controller 106. The power supply 105 provides independent power to each component through a power circuit 111, and the logic controller 105 is configured to communicate with other components and entities through an external communication link 114.

The liquid sensor 102 is generally deployed to sense water and/or other chemical and fluid exposures beneath permeable outer or upper layers. Exemplary but not exhaustive examples of the liquid sensor 102 include point sensors, single point cable-based sensors, and full path cable-based sensors. Point sensors are generally single small sensors that can detect liquid via a small exposed surface. Single point cable-based sensors are generally flexible cables containing a plurality of single point sensors located at one or points along the cable, each point sensor configured to individually or in combination report the detection of contact with a liquid. And full path cable-based sensors are cables that can detect liquid along portions of or the full path of the cable. Some embodiments configure the liquid sensor 102 to repeatedly sense and report multiple unique liquid-sensing events without loss of accuracy, though in other examples the liquid sensor 102 may be a single event/single use sensor 102.

Figure 2:
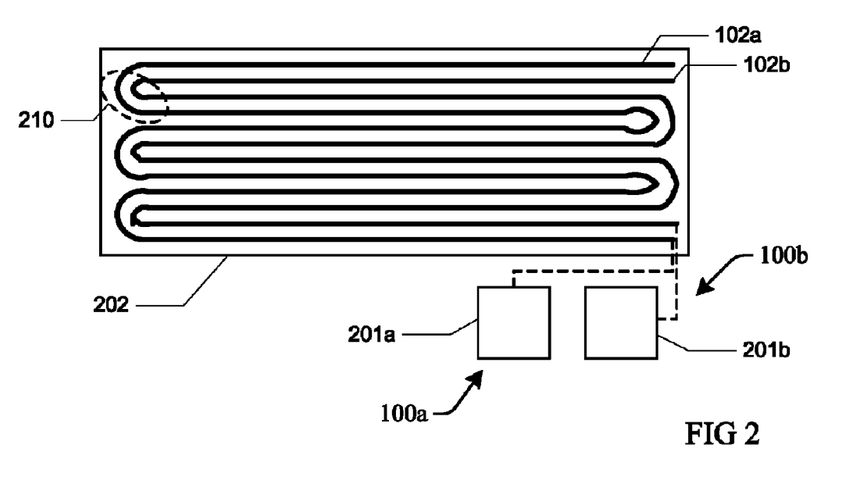
FIG. 2 provides a top plan view of an exemplary liquid sensor detection system deployment according to the present invention.

FIG. 2 illustrates a top plan view of an exemplary deployment of a pair of detector systems 100a, 100b. Cable liquid sensors 102a, 102b in circuit communication with respective detector system 100a, 100b control blocks 201a, 201b and are deployed in a generally flat parallel ribbon pattern and configured to sense water, fluid or chemical exposures throughout a planar region 202 surrounding the sensors 102a, 102b. The cable liquid sensors 102a, 102b may be configured to sensor liquids and/or chemicals along their entire respective cable length, or at a plurality of discrete sensor points, as will be understood by one skilled in the art. Each control block 201a, 201b comprises the remainder of the respective detector system 100 components 105, 106, 107, 108 as discussed above and is configured for unobtrusive installation relative to the sensor region 202.

Figure 3:
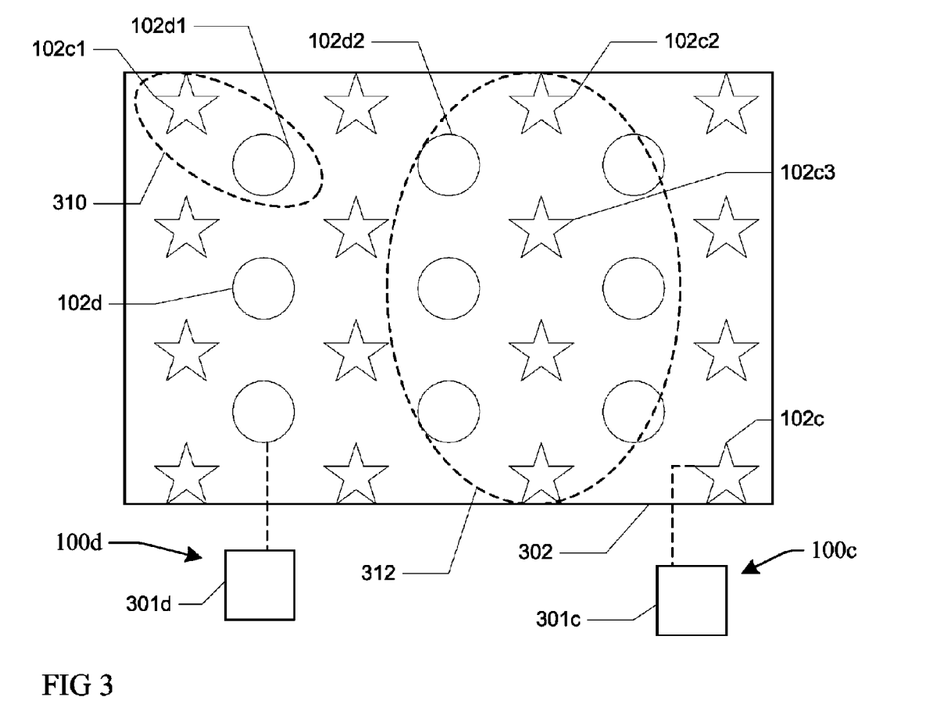
FIG. 3 provides a top plan view of another exemplary liquid sensor detection system deployment according to the present invention.

FIG. 3 illustrates a top plan view of another exemplary detector system 100c,100d deployment. A plurality point liquid sensors 102c,102d configured to sense water, fluid or chemical exposures are provided in circuit communication with respective detector system 100c,100d control blocks 301c,301d and are deployed to define an alternating matrix pattern and throughout a region 302 surrounding the sensors 102c,102d, the control blocks 301a,301b comprising the remainder of the detector system 100 components 105, 106, 107, 108 as discussed above and configured for unobtrusive installation relative to the sensor region 302.

Deploying the sensor detectors 100 in pairs or other pluralities in a given sensing region provides redundancy, enabling sensing of a liquid exposure to a sensor region 202,302 even if a one of a deployed sensor plurality pair 100a-100b or 100c-100d fail. Protection may also be provided against false positive reporting from a failing sensor by enabling a confirmation or verification process: for example, a liquid exposure to area 210, 310 or 312 will be sensed and reported by sensor pairs 100a-100b or 100c-100d, respectively, hence failure of one of the pairs to confirm a liquid sensing output report by the other of the pair indicates that one of the pair has failed. Thus increasing sensor density within regions likely to become saturated or otherwise defining a minimal area of concern increases reliability of fluid exposure reporting by the present invention: some embodiments require each of a sensor pair 100a-100b or 100c-100d to sense a liquid exposure as a condition predicate to determining a confirmed/verified liquid exposure to regions 210, 310 or 312, wherein liquid exposure reporting relative to the larger region 312 encompassing more than two sensors 102c and 102d is more reliable than the coverage of the smaller regions 210 and 310. Thus increasing the density of sensor deployments relative to expected liquid exposure footprints improves a level of confidence in liquid sensor 102 event reporting, proportionately reducing the risk in requiring damaging or difficult invasive physical inspections of areas underlying permeable top layers.

Figure 4A:
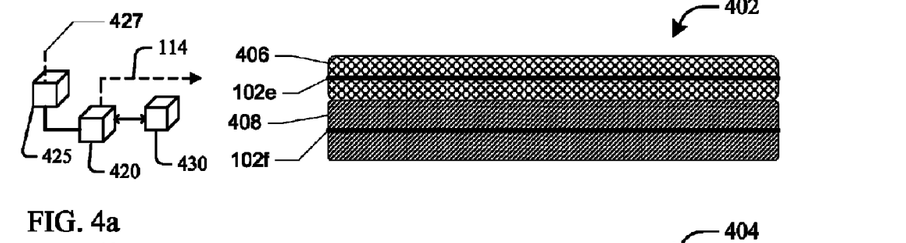
FIGS. 4a and 4b provide side cross-sectional perspective views of exemplary liquid sensor detection system deployments according to the present invention.
Figure 4B:
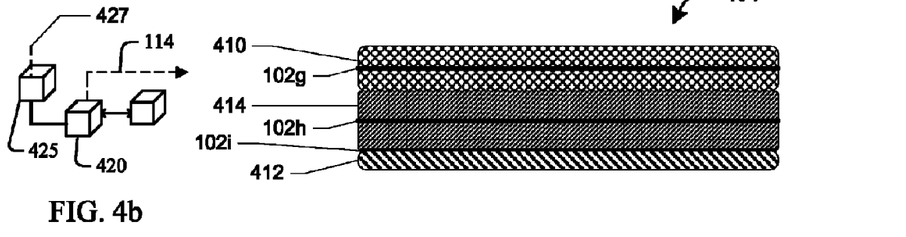

FIGS. 4a and 4b provide side perspective cross-sectional views of some exemplary liquid sensor 102e-102i deployments with respect to seating and flooring assemblies 402, 404, respectively; for ease of illustration the liquid sensor 102e-102i are depicted as cable liquid sensors, though it will be understood that other types of liquid sensors 102 may be utilized and deployed to sense fluid exposures in the areas 406-414 illustrated. Thus one or more liquid sensors 102e are embedded or fabricated into a seating cushion upper surface component 406 (for example a cloth or leather seating surface material 406) and configured to sense surface liquid exposures. At least one liquid sensor 102f may also be embedded or fabricated into a cushioning material layer 408 disposed below the upper layer 406 and configured to sense liquids passing therein that may pass through the upper layer 406 and into the supporting cushioning material layer 408.

One or more liquid sensors 102g may also be embedded or fabricated into carpeting (or other floor surface covering material) 410 and configured to sense liquid exposures to the carpeting or upper surface thereof 410. Liquid sensors 102h may also be deployed beneath the carpeting 410 in a cushioning layer 414 above a base floor surface 412 and configured to sense liquids passing through the upper carpet layer 410 and into the supporting cushioning material layer 414. In some embodiments at least one bottom layer liquid sensor 102i is provided directly on the base floor member 412, positioned and configured to sense fluid exposures soaking through both the carpet 410 and cushioning layer 414 down to the base floor layer 412.

Embodiments of the detector 100 liquid sensors 102 may be of a thin or small size, enabling unobtrusive or difficult to detect installation, deployment and subsequent operation. This enables detecting liquid exposures below permeable upper surfaces while remaining undetected from inspection of a permeable upper surface material itself. Further, by deploying the sensors 102 below permanent upper carpeting 410 or seating upholstery 406 layers liquid exposures may be sensed that are otherwise detected only through disassembly or destruction of the upper layers 406 and/or 410.

The fluid detection systems 100 may be deployed in any assembly or application for which knowledge of and sensing and detection of liquid exposure may be desired. For example, the seating assembly 402 and/or flooring assembly 404 and their associated sensors 102 may be utilized in vehicles including passenger cars, utility and pick-up vehicles, trucks, and all-terrain vehicles (ATV's), as well as aircraft, boating, and other vehicles, and also in interior housing environments such as, hotels, condominiums, rental housing and apartments, enabling the owner or manager of an occupancy unit to monitor and detect liquid exposures to furniture, bedding and carpeting. Other applications will be apparent, and the present examples are merely illustrative and not exhaustive embodiments of the present invention.

The memory 108 generally comprises nonvolatile storage media and in some embodiments is tamper-proof and weather-resistant, and moreover configured to withstand a wide range of temperatures. And the external communication 114 is configured to communicate liquid exposure event data from the controller 106 and/or the memory 108 to external entities, such as service providers or maintenance entities.

In some embodiments a detector system 100 may be configured as a stand-alone system 100, wherein outputs by a liquid sensor 102 are processed by the logic controller 106, determinations as to whether a fluid exposure event has occurred are made by the controller 106 and data associated with said determinations are stored by the controller 106 into the memory and/or broadcast to another system or entity through the external link 114. In other embodiments the detector systems 100 are configured to communicate with a central entity or processing means which make fluid exposure event determinations and/or detector failure determinations in response to one or more detector system 100 data outputs. FIGS. 4a and 4b illustrate embodiments wherein detector external links 114 are in a circuit communication with a central processor component or monitoring entity 420, which is itself in communication with a vehicle or housing unit computer 425. In one automotive application embodiment the computer 425 is second-generation on-board diagnostic interface (OBD-II) computer configured to provide a gateway through an OBD-II interface 427 that enables the retrieval of vehicle diagnostic and error information, for example by vehicle service technicians and other service provider and monitoring entities connecting to the OBD-II interface. And in a housing unit application embodiment the computer 425 is an automated system manager computer configured to monitor housing systems such as HVAC, power, water and fire detection and alarm systems for trouble and incident reporting, and thus in one example the system 425 may monitor guest rooms in a hotel for liquid exposures to furnishings during guest usage. And it will be understood that in some embodiments the vehicle or housing system computer 425 may function directly as the central processor component/monitoring entity 420.

The central processor component or monitoring entity 420 is configured to retrieve fluid exposure or detector status event data from detector memories 108 or controllers 106 and communicate the data through a variety of methods, including for example through the OBD-II interface 427. Other wired and wireless communication methods may also be practiced by the central processor component/monitoring entity 420 in retrieving information through the link 114 and/or outputting data to other systems and entities. Examples of wireless configurations include controllers 106, links 114 and/or central processor components/monitoring entities 420 configured for communication with Bluetooth™, wireless fidelity (WiFi), WIMAX, Near Field Communications (NFC), Zigbee, RuBee, 802.11 wireless local area network (WLAN), short message service (SMS) and/or radio frequency identification (RFID) reader components, and other alternative components, technology, proprietary protocols and physical connections appropriate to practice the present invention(s) will be apparent to one skilled in the art.

Figure 5:
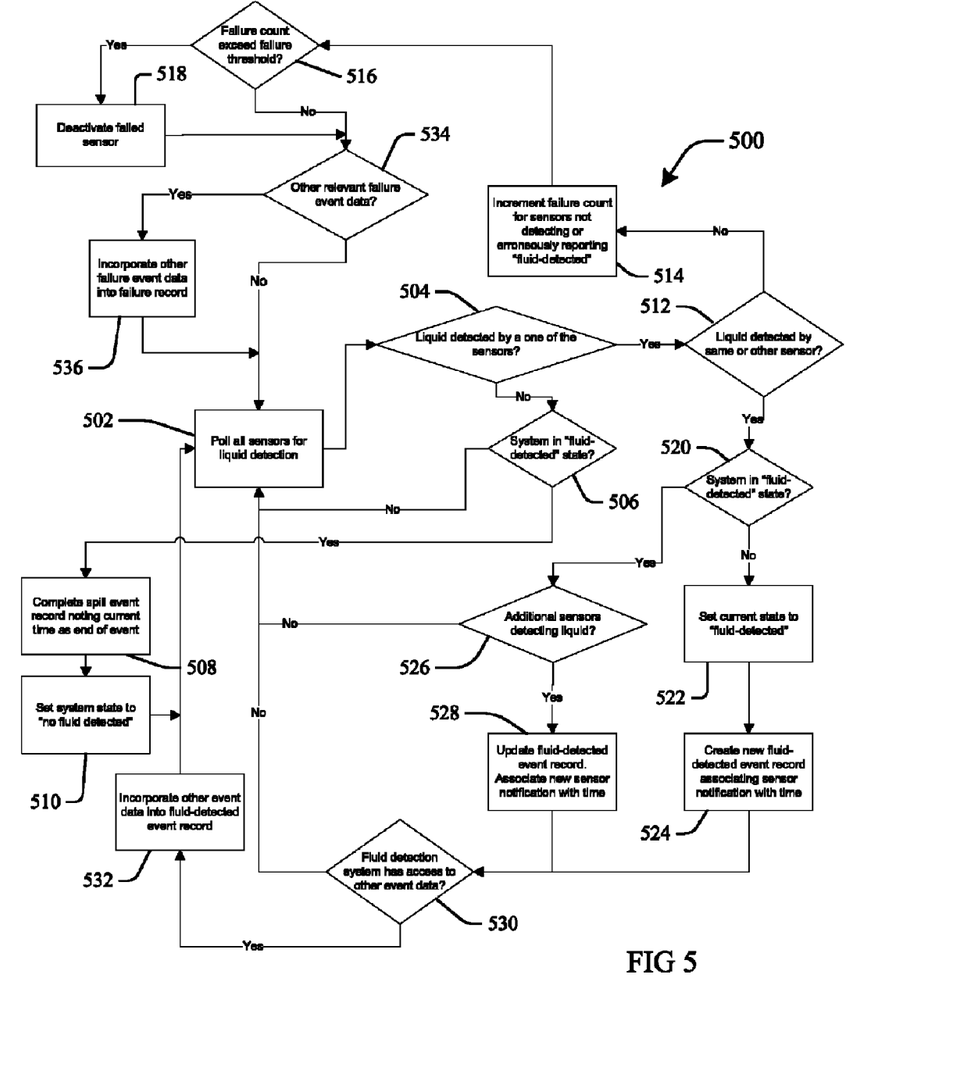
FIG. 5 is block diagram view of a process and method for monitoring a plurality of fluid detection devices.

Event data may be communicated by the detector controller 106 or retrieved from the memory 108 in response to externally-initiated queries by the central processor component/monitoring entity 420 or other entity, or it may "pushed" out thorough the external link 114 upon determination by the controller 106 in response to a detected event or state change. FIG. 5 illustrates one system and/or process 500 for a central processor component/monitoring entity 420 to monitor a plurality of the detectors 100 installed in a vehicle, housing or other application. The process/system 500 commences at 502 with the central processor component/monitoring entity 420 polling all detectors 100 through their supervisor network communication links 114. Polling at 502 may occur in response to a variety of initiative prompts, including for example a timer input prompt at the end of a test interval epoch by a detector timer 107 or other timer logic or circuit component (not shown) utilized by the central processor component/monitoring entity 420. At 504 the central processor component/monitoring entity 420 polls the detector logic controllers 106 to determine whether any one of the associated liquid sensors 102 is currently detecting a liquid.

If no polled detector 100 reports that their respective sensors 102 are currently detecting liquid, then no spill or other liquid exposure event is presently occurring, and the current fluid-detection state of the central processor component/monitoring entity 420 is ascertained at 506. If the state is not currently in a "fluid-detected" state the process/system 500 returns to the start point at 502 to await initiation of another polling iteration in response to one or more system prompts. However, if the current state ascertained at 506 is a "fluid-detected" state, then since no sensors 102 are currently detecting liquid a previously determined fluid-detected event has ended, and event time and date data associated with the negative poll results obtained at 504 is logged or otherwise used at 508 to determine the end of the fluid-detected event, the current fluid-detection state is reset to a "no fluid-detected" state at 510, and the process returns to the start point at 502 to await initiation of another polling iteration or other initiating stimulus.

If however at least one polled detector 100 or sensor 102 reports currently detecting liquid at 504, then occurrence of a fluid exposure is verified at 512 by re-polling the sensing detector 100 or sensor 102 and/or ascertaining whether any other detector 100 or sensor 102 is currently sensing a fluid exposure. For example, referring again to FIG. 3 a pair of point sensors 102c1 and 102d1 may be deployed adjacent to each other within a portion 310 of the sensor deployment area 302, wherein fluid exposure encompassing the portion 310 should result in fluid exposure reporting by both sensors 102c1 and 102d1. And referring again to FIG. 2, a fluid exposure encompassing the portion 210 should result in fluid exposure reporting by both parallel cable sensors 102a and 102b. Thus if one of each pair 102a-102b and 102c1-102d1 fails to report fluid exposure when the other does, then either the reporting one or the non-reporting one of the two sensors may be in failure mode.

The central processor component/monitoring entity 420 may also be configured to determine at 512 which at least one other detector 100 or sensor 102 should also be reporting liquid detection relative to another detector 100 or detector 102 reporting fluid exposure. Thus referring to FIG. 3, if sensors 102c2 and 102d2 located on the periphery of a sub-region spill footprint 312 are reporting fluid exposure, then the sensors 102c3 located at the center of and encompassed by the footprint 312 should also be reporting fluid exposure: thus failure of either footprint center sensor 102c3 to report fluid exposure indicates not that a fluid exposure event is not occurring, but that the non-reporting sensor 102c3 has failed.

In response to a failure determination of a sensor 102 or associated detector 100 at 512 a failure count for an identified failing detector 100 or sensor 102 is incremented at 514. The incremented failure count is compared to a failure count threshold at 516, and if not greater than the threshold the detector 100 or sensor 102 is left activated for subsequent polling iterations at 502. But if the incremented failure count is greater than the threshold, then the failing detector 100 or sensor 102 is deactivated at 518.

If detection of a fluid exposure event at 504 is confirmed by re-polling a reporting detector 100 or sensor 102 and/or another at least one detector 100 or sensor 102 currently reporting submersion at 512, then the current fluid-detection state is ascertained at 520. If the state is not currently "fluid-detected", then the state is set to "fluid-detected" at 522 and a new fluid exposure event is created at 524, including recording time and date data associated with the fluid exposure event detection data.

But if the current state ascertained at 520 is already set to "fluid-detected", then the current fluid exposure event has already been determined through a previous iteration of the process as commenced at 502, and at 526 it is ascertained whether any detector 100 or sensor currently reporting fluid exposure at 512 is "new": that is, it had not reported fluid exposure during this event in a previous iteration of the process commencing at 502. If at 526 any detector 100 currently reporting fluid exposure is new, then the current fluid exposure event record data is updated at 528 by adding data from each new reporting detector 100 or sensor 102. If instead no detector 100 or sensor 102 currently reporting a fluid exposure is new, then the process continues to its next iteration commencing at 502.

In some embodiments, additional failure or fluid exposure event data may be acquired at 534 or 530, and associated with a fluid detection or system failure event at 532 or 536, respectively. In some embodiments the detector system 100 and/or the central processor component/monitoring entity 420 is configured as a supervised system. Supervised systems and methods are generally understood as providing for self-monitoring for system failures and automatic notification of system failures, and thus the supervised system and method incorporates components and/or processes that provide for a built-in monitoring and self-checking for functionality without requiring an external supervisory entity to engage and monitor the system. Exemplary supervised systems include fire alarm systems, which generally provide immediate notification through initiating an alarm condition when a system component failure is detected through an internal monitoring component and process, thus broadcasting an alarm or notifying a supervisory entity of the failure. Accordingly, in some embodiments the detector 100 is configured to self-detect at 534 and report failure of the detector 100 at 536, for example through damage or interruption to the power circuit 111 or the communication circuit 112 in response to accidental or intentional removal of any one of the components 102, 105, 106, 107, 108.) A constant current may be maintained through detector power circuits 111 or communication circuits 112 wherein cutting or interrupting any portion of the power circuit 111 or communication circuit 112 will break the current, a controller 106 configured to sense the interruption at 534 and record and/or report a failure or tampering event at 536. And in some embodiments a central processor component/monitoring entity 420 is configured to monitor communication with each detector 100 through each external link 114 and self-detect and report a system failure at 534 if communication with any external link 114 is lost, the central processor component/monitoring entity 420 configured to sense the interruption at 534 and record and/or report a failure or tampering event at 536.

Similarly, at 530 additional fluid detection event data may be acquired and associated with or incorporated into the fluid exposure event data at 532. In some mobile applications, such as vehicle and aircraft installations, the central processor component/monitoring entity 420 or detector logic controller 106 may communicate with and receive positional data from a Global Positioning System (GPS) transponder component 430. In one aspect GPS location information may be used to identify, verify and/or confirm a rainwater exposure event by providing correlation of a vehicle location with a geographic location experiencing a thunderstorm at the time and date of an observed event.

Data from other vehicle or building systems and sensors may also be acquired at 530 and/or 534, such as through a vehicle OBD-II interface or a building alarm or heating, ventilation and cooling (HVAC) systems. Thus whether a door, window, skylight and/or convertible roof was open during the detected fluid exposure event, or temporally proximate thereto (i.e., they were open before fluid is detected, with a delay from exposure to rain or snow water saturation into an area sensed by a liquid sensor 102) may be determined through the OBD-II interface or through HVAC or alarm system data. Thus in one example a central processor component/monitoring entity 420 or detector logic controller 106 or service provider or other entity may determine that a window was open at the time of a moisture-producing weather event occurring at the location of a building, or at location of a vehicle as established by GPS data. Fire and burglar alarm status and data, and vehicle or building electrical power and other utility system data may also be acquired and associated with a failure or fluid exposure event, and other data appropriate for incorporation into event data may be apparent to one skilled in the art.

Some or all of the components of the detector 100 and/or central processor component/monitoring entity 420 could be deployed, managed, serviced, etc. by a service provider who offers to implement, deploy, and/or perform the functions of the present invention for others. Thus the memory storage element 108 may be provided, secured and/or maintained by a service provider, in some examples locating the memory 108 physically remote from one or more other of the elements 101-107. In some examples a service provider may interrogate the memory 108 to collect data information. Exemplary but not exhaustive examples of service providers include car dealerships, government agencies, insurance companies and housing unit managers and owners.

In some embodiments the power supply 105 comprises a rechargeable, long-lasting internal battery that is kept charged by a circuit communication (not shown) with an external power source, such as an automobile battery or a dedicated power circuit from a building electrical system: this enables the detector 100 to remain powered for operation even if external power is cut off. In some examples a loss of external power is logged by the controller 106 to the memory 108, wherein subsequent review of the logged memory 108 data may identify a power loss event as a tampering event. As some power loss may occur through non-tampering events (for example, a failure of an automobile battery or loss of power to a building from a utility provider), other data including other fluid exposure event data stored in the memory 108 or reported by the controller 106 may be used to corroborate a power loss as a tampering event: thus data indicative that a vehicle battery is operational when power is not flowing to the detector 100 may indicate that power to be power supply 105 has been intentionally interrupted.

II. Computerized Implementation

Figure 6:
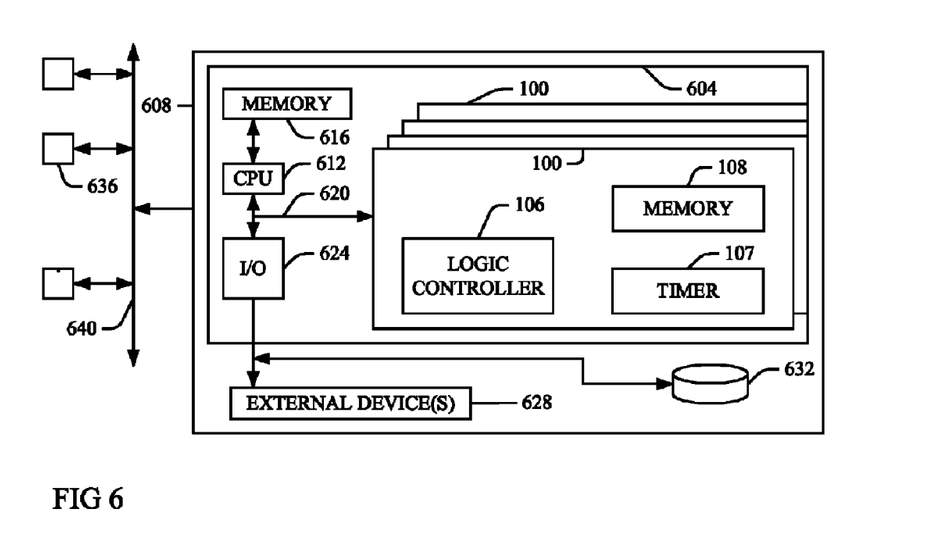
FIG. 6 is a block diagram illustrating an exemplary computerized implementation of a system and method for monitoring fluid detection devices.

Referring now to FIG. 6, an exemplary computerized implementation includes a computer system 604, for example the central processor/monitoring entity 420 illustrated in FIG. 4, deployed within a computer infrastructure 608 and configured to detect and report fluid exposure events according to the present invention. This is intended to demonstrate, among other things, that the present invention could be implemented within a network environment 640 (e.g., the Internet, a wide area network (WAN), a local area network (LAN) 640, a virtual private network (VPN), etc.) 640, and thus in communication with one or more other computers or computer systems 636; or on a stand-alone computer system 608.

Communication throughout the network 640 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 604 includes a central processing unit (CPU) 612, a computer system memory 616, input/output (I/O) interfaces 624 and a bus 620 in communication with each of a plurality of fluid exposure detector 100 logic controllers 106. In general, the processing unit 612 and detector controller 106 execute computer program code to implement various logic components of the fluid exposure sensing detector 100, including the controller 106 and timer 107 components discussed above, the computer program code stored in the detector memory 108, computer system memory 616 and/or storage system 632, though it is to be appreciated that the controller 106 and timer 107 components may be implemented as a single component. Further, the computer system 604 is shown in communication with external I/O devices/resources 628 (for example including the GPS component 430) and a storage system 632. Thus the computer system 604 and detector 100 are configured to perform the fluid exposure sensing and reporting method and process 500 illustrated in FIG. 5 and as discussed above.

While executing computer program code, the processing unit 612 and logic controller 106 can read and/or write data to/from the system memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, the computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 612 may comprise a single processing unit, or be distributed across one or more processing units in one or more locations, e.g., on a client and server. Similarly, the detector memory 108, system memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 6 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) 640. In addition, although not shown, additional components, such as cache memory, communication systems, system software, etc., may be incorporated into computer system 604.

While shown and described herein as a method and a system, it is understood that the invention further provides various alternative embodiments. For example, in one embodiment, the invention provides a computer-readable/useable medium that includes computer program code to enable a computer infrastructure to sense and observe fluid exposure events. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the detector memory 108, the system memory 616 and/or the storage system 632 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage vehicle fluid exposure or detector status monitoring, reporting, data retrieval and/or system configuration. In this case, the service provider can create, maintain, support, etc., a computer infrastructure, such as the computer infrastructure 608 that performs process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing fluid exposure or detector status monitoring event sensing, reporting, and data retrieval. In this case, a computer infrastructure, such as computer infrastructure 608, can be provided and one or more systems for performing process steps of the invention can be obtained (e.g., created, purchased, used, modified, etc.) and deployed to the computer infrastructure. To this extent, the deployment of a system can comprise one or more of: (1) installing program code on a computing device, such as the detector memory 100, the computer system 604, the vehicle central processor/monitoring entity 420 and/or the vehicle computer 425, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for monitoring an article for fluid exposure, comprising:
   incorporating a plurality of liquid sensors into an article beneath an outer layer in a furnishing installation, wherein the article and the sensor are not visually apparent without removal of the outer layer;
   a processor component polling each of the plurality of liquid sensors to determine whether any of the plurality of liquid sensors are currently detecting liquid, the processor component having a state set to fluid-detected or to no-fluid-detected;
   if none of the polled plurality of liquid sensors are currently detecting liquid and the state is set to fluid-detected, resetting the state to no-fluid-detected and associating polling temporal data to an open fluid exposure event data entry in a memory;
   if at least a first of the polled plurality of liquid sensors is currently detecting liquid:
      re-polling the first and a second of the polled plurality of liquid sensors to determine whether each is currently detecting liquid;
      if either of the first and the second re-polled sensors is not currently detecting liquid, creating a failure event data entry in the memory for a one of the first and the second re-polled sensors and setting the state to no-fluid-detected, else:
         if the state is no-fluid-detected, setting the state to fluid-detected, creating a new fluid exposure event data entry in the memory including polling and re-polling temporal data; or
         if the state is fluid-detected, adding temporal data associated with the re-polling of the plurality of sensors to the open fluid exposure event data entry in the memory.

2. The method of claim 1, comprising deploying pairs of the plurality of sensors each within expected liquid exposure saturation footprint areas of the article, wherein re-polling the first and the second liquid sensor comprises selecting first and second paired sensors.

3. The method of claim 2, comprising reporting a tampering event if a circuit communication from a one of the plurality of sensors to the processing means or a power source connected to the plurality of sensors is interrupted.

4. The method of claim 3, comprising a GPS transponder in communication with the processing means communicating GPS coordinate data associated with the polling or the re-polling to the processing means, the processing means associating the GPS coordinate data with at least one of the open fluid exposure event data entry, the new fluid exposure event data entry, or the failure event data entry.

5. The method of claim 4, comprising the processing means associating weather condition data with the associated at least one of the open fluid exposure event data entry, the new fluid exposure event data entry, or the failure event data entry.

6. The method of claim 5, comprising the processing means associating data indicative of a structural component positioned to admit rain or snow onto the outer layer with the associated at least one of the open fluid exposure event data entry, the new fluid exposure event data entry, or the failure event data entry.

7. The method of claim 6, comprising the processing means associating data indicative of a power source status with the associated at least one of the open fluid exposure event data entry, the new fluid exposure event data entry, or the failure event data entry.

8. A service for monitoring an article for fluid exposure, comprising:
   providing a computer infrastructure being operable to:
   poll each of a plurality of liquid sensors to determine whether any of the plurality of liquid sensors are currently detecting liquid present, the computer infrastructure having a state set to fluid-detected or to no-fluid-detected, wherein the plurality of liquid sensors are incorporated into an article beneath an outer layer in a furnishing installation, and wherein the article and the sensor are not visually apparent without removal of the outer layer;
   if none of the polled plurality of liquid sensors are currently detecting liquid and the state is set to fluid-detected, reset the state to no-fluid-detected and associate polling temporal data to an open fluid exposure event data entry in a memory;
   if at least a first of the polled plurality of liquid sensors is currently detecting liquid:
      re-poll the first and a second of the polled plurality of liquid sensors to determine whether each is currently detecting liquid; and if either of the first and the second re-polled sensors is not currently detecting liquid, create a failure event data entry in the memory for a one of the first and the second re-polled sensors and set the state to no-fluid-detected, else:
if the state is no-fluid-detected, set the state to fluid-detected, create a new fluid exposure event and associate polling and re-polling temporal data with the new fluid exposure event; or
if the state is fluid-detected, add temporal data associated with the re-polling of the plurality of sensors to the open fluid exposure event data entry in the memory.

9. The service of claim 8, wherein pairs of the plurality of sensors are deployed each within a plurality of expected liquid exposure saturation footprint areas of the article, the computer infrastructure operable to re-poll the first and the second of the polled plurality of liquid sensors by selecting at least one of the plurality of sensors proximate to the first sensor within a one of the footprint areas as the second liquid sensor.

10. The service of claim 9, the computer infrastructure operable to report a tampering event if a circuit communication from a one of the plurality of sensors to the computer infrastructure or a power source connected to the plurality of sensors is interrupted.

11. The service of claim 10, the computer infrastructure operable to obtain GPS coordinate data associated with the polling or the re-polling and associate the GPS data with at least one of the open fluid exposure event data entry, the new fluid exposure event data entry, or the failure event data entry.

12. The service of claim 11, the computer infrastructure operable to associate weather condition data with the associated at least one of the open fluid exposure event data entry, the new fluid exposure event data entry, or the failure event data entry.

13. The service of claim 12, the computer infrastructure operable to obtain component data indicative of a structural component positioned to admit rain or snow onto the outer layer and associate the component data with the associated at least one of the open fluid exposure event data entry, the new fluid exposure event data entry, or the failure event data entry.

14. The service of claim 13, the computer infrastructure operable to obtain power source data indicative of liquid sensor power source status and associate the power source data with the associated at least one of the open fluid exposure event data entry, the new fluid exposure event data entry, or the failure event data entry.

15. An article of manufacture, comprising:
a computer readable storage device having computer readable program code embodied therewith, the program code comprising instructions which, when executed on a computer system, causes the computer system to:
poll each of a plurality of liquid sensors to determine whether any of the plurality of liquid sensors are currently detecting liquid present, the computer system having a state set to fluid-detected or to no-fluid-detected, wherein the plurality of liquid sensors are incorporated into an article beneath an outer layer in a furnishing installation, and wherein the article and the sensor are not visually apparent without removal of the outer layer;
if none of the polled plurality of liquid sensors are currently detecting liquid and the state is set to fluid-detected, reset the state to no-fluid-detected and associate polling temporal data to an open fluid exposure event data entry in a memory;
if at least a first of the polled plurality of liquid sensors is currently detecting liquid:
re-poll the first and a second of the polled plurality of liquid sensors to determine whether each is currently detecting liquid; and
if either of the first and the second re-polled sensors is not currently detecting liquid, create a failure event data entry in the memory for a one of the first and the second re-polled sensors and set the state to no-fluid-detected, else:
if the state is no-fluid-detected, set the state to fluid-detected, create a new fluid exposure event data entry in the memory including polling and re-polling temporal data; or
if the state is fluid-detected, add temporal data associated with the re-polling of the plurality of sensors to the open fluid exposure event data entry in the memory.

16. The article of manufacture of claim 15, wherein the program code, when executed on the computer system, causes the computer system to report a tampering event if a circuit communication from a one of the plurality of sensors to the computer system or a power source connected to the plurality of sensors is interrupted.

17. A fluid detection system configured to monitor an article for fluid exposure, comprising:
a processing means comprising a logic controller; and
a plurality of liquid sensors in circuit communication with the processing means, the plurality of liquid sensors incorporated into an article beneath an outer layer in a furnishing installation wherein the article and the sensor are not visually apparent without removal of the outer layer;
wherein the processing means is configured to:
poll each of the plurality of liquid sensors to determine whether any of the plurality of liquid sensors are currently detecting liquid present within the article, the processing means having a state set to fluid-detected or to no-fluid-detected;
if none of the polled plurality of liquid sensors are currently detecting liquid and the state is set to fluid-detected, reset the state to no-fluid-detected and associate polling temporal data to an open fluid exposure event data entry in a memory device in communication with the processing means;
if at least a first of the polled plurality of liquid sensors is currently detecting liquid:
re-poll the first and a second of the polled plurality of liquid sensors to determine whether each is currently detecting liquid; and
if either of the first and the second re-polled sensors is not currently detecting liquid, create a failure event data entry in the memory for a one of the first and the second re-polled sensors and set the state to no-fluid-detected, else:
if the state is no-fluid-detected, set the state to fluid-detected, create a new fluid exposure event data entry in the memory including polling and re-polling temporal data; or
if the state is fluid-detected, add temporal data associated with the re-polling of the plurality of sensors to the open fluid exposure event data entry in the memory.

18. The system of claim 17, wherein pairs of the plurality of sensors are deployed each within expected liquid exposure saturation footprint areas of the article, the processing means configured to re-poll the first and the second of the polled plurality of liquid sensors by selecting at least one of the plurality of sensors proximate to the first sensor within a one of the footprint areas as the second liquid sensor.

19. The system of claim 18 wherein the article is a vehicle interior furnishing or flooring component, the outer layer is a fabric or fiber layer permeable to liquid, and the processing means is an onboard vehicle diagnostic interface computer.

* * * * *